United States Patent [19]
Greenwood

[11] Patent Number: 4,503,715
[45] Date of Patent: Mar. 12, 1985

[54] LOAD SENSORS
[75] Inventor: John C. Greenwood, Harlow, England
[73] Assignee: International Telephone and Telegraph Corporation, New York, N.Y.
[21] Appl. No.: 464,812
[22] Filed: Feb. 8, 1983
[30] Foreign Application Priority Data
Feb. 9, 1982 [GB] United Kingdom ............... 8203646
[51] Int. Cl.³ ............................................. G01L 1/10
[52] U.S. Cl. ............................. 73/862.59; 73/DIG. 1
[58] Field of Search .......... 73/DIG. 1, 517 AV, 778, 73/581, 704, 862.59, 702; 331/156

[56] References Cited
U.S. PATENT DOCUMENTS
3,101,001  8/1963  Appleton ................... 73/517 AV X
3,257,850  6/1966  Koorman ........................... 73/702
3,327,533  6/1967  Koorman ........................... 73/702

Primary Examiner—James L. Rowland
Assistant Examiner—Brian R. Tumm
Attorney, Agent, or Firm—T. L. Peterson; E. C. Jason

[57] ABSTRACT

An electro-mechanical load sensor is in the form of a mechanical resonant system with electrostatically coupled electrodes. The mechanical system is formed from a silicon wafer by a selective etching process and comprises a filament of between two terminations 12 and 13 carrying transverse plates $M_1$ and $M_2$. Electrostatic (capacitive) coupling to plate electrodes $E_1$, $E_2$, $E_3$ in a self-exciting circuit drives the system. The resonant frequency for angular S vibrations with plates $M_1$ and $M_2$ in anti-phase varies with applied load L and is thus a measure of this load.

3 Claims, 6 Drawing Figures

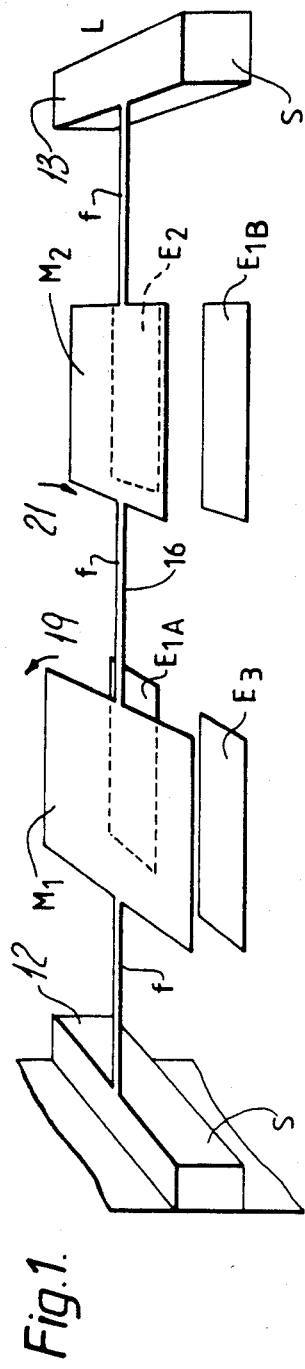
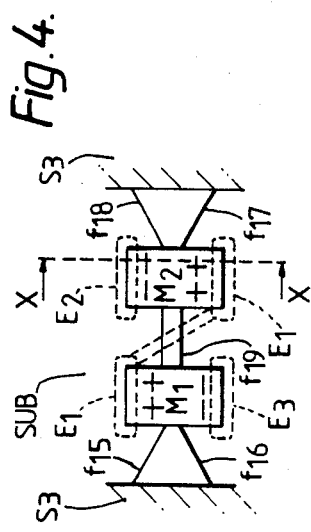
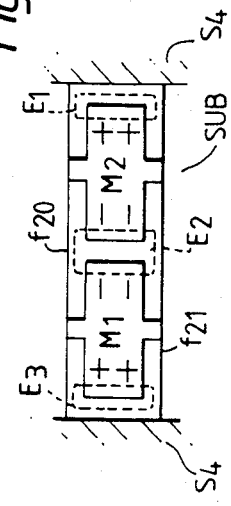
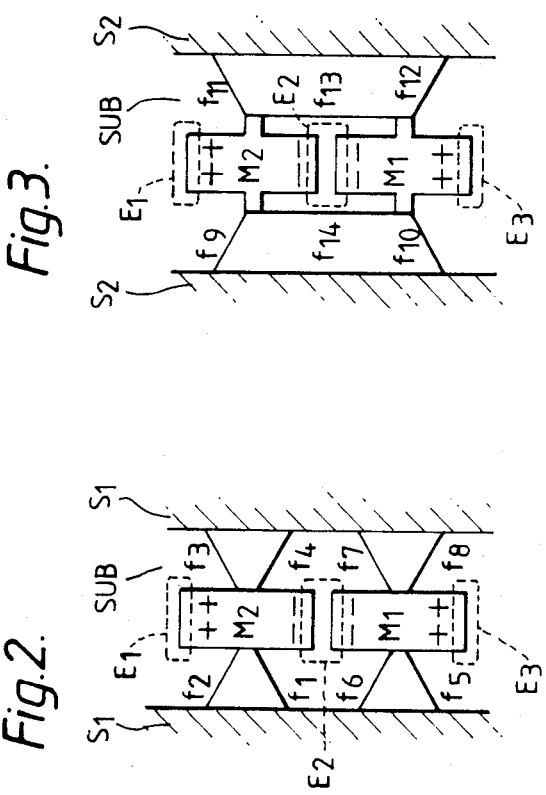

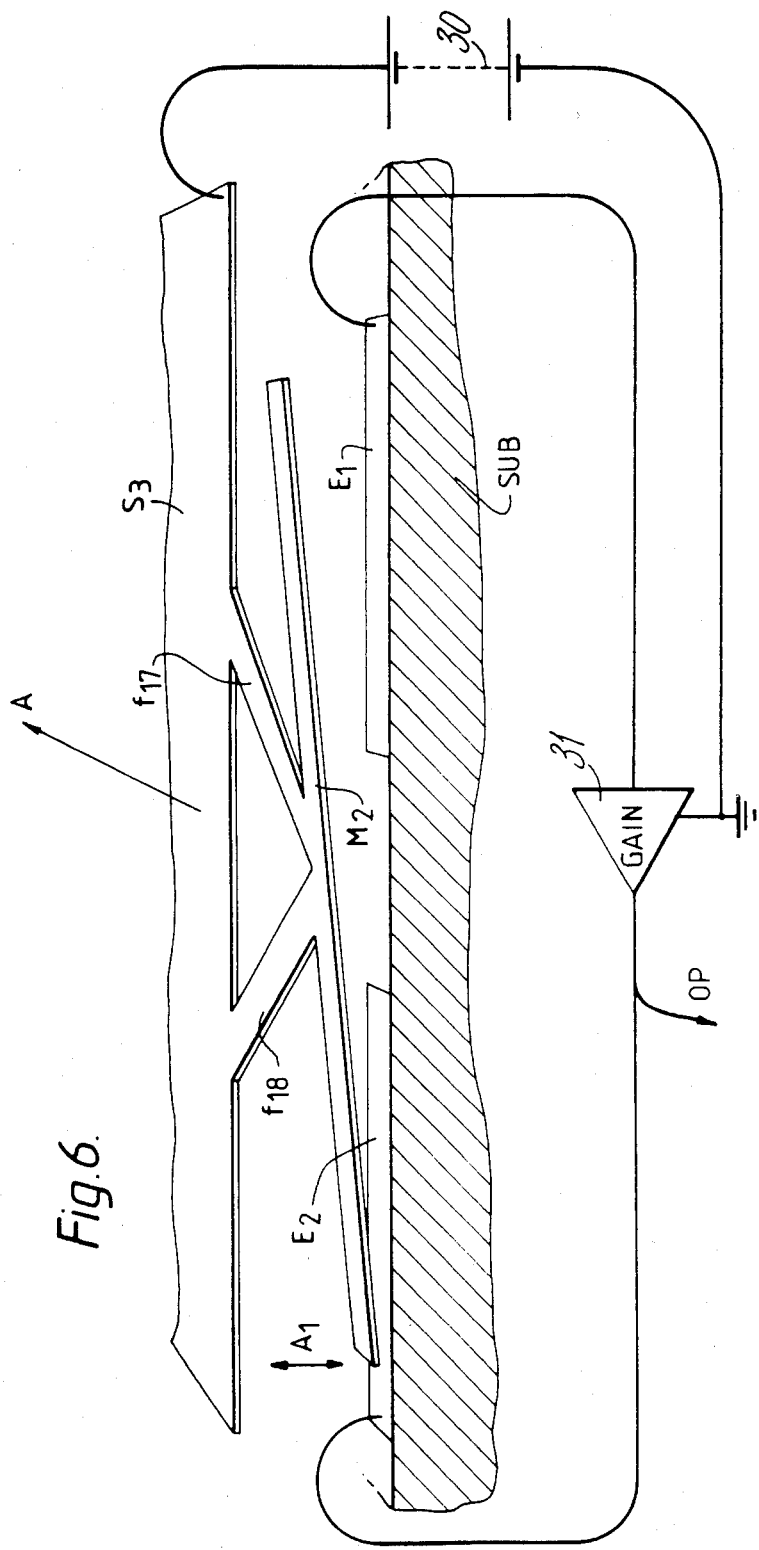

LOAD SENSORS

BACKGROUND OF THE INVENTION

This invention relates to load sensors.

It has previously been proposed to provide an electrically excited mechanical resonator which has a resonant frequency dependent on a mechanical load applied to the resonator and to utilise variations in the resonant frequency as an indication of the applied load. A problem with this kind of device is to provide the mechanical resonator with a high Q and with little likelihood of spurious resonances either due to pick-up of external vibrations or coupling with other masses or with alternative modes of vibration.

SUMMARY OF THE INVENTION

An object of the invention is to provide a load sensor incorporating an electrically excited resonator in which these problems are reduced.

According to the invention there is provided a load sensor comprising a balanced vibratory system including two lamina masses supported by filaments in tension from a support structure and electrically coupled to electrodes for causing angular vibration of the masses, and for providing an output signal, wherein the resonant frequency of the system can be sensed from the output signal and serves as a measure of the load applied to the sensor, the masses and the filaments having been fabricated by a photolithographic process.

Provided the two vibratory masses are equal, their absence of translational movement and the directly opposed movement provide a balanced system which tends to be insensitive to external vibrations and tends not to couple in external masses in a spurious vibratory mode.

Preferably the masses vibrate about a common axis and the rotational stiffness of the sections of filament extending beyond the two masses are less than the stiffness of filament between the masses so that the frequency at which the two masses would vibrate in phase is remote from the frequency at which they vibrate in anti-phase. This low stiffness of resilient coupling to an external mounting for the system tends further to reduce the coupling to external masses or transmission of spurious external vibration.

The use of electro-static coupling through what are in effect capacitor plates adjacent the vibrating plates provides a system in which direct electrical coupling between the plates is negligible.

The assembly of filaments and plates can conveniently be formed by a selective etching process from a silicon wafer. In the same etching process, the support and mounting terminations for the filament can be formed integrally from unetched portions of the silicon wafer.

The moments of inertia of the two masses about the vibrational axis, or axes should preferably be equal to each other.

In order that the invention can be easily understood reference will now be made to the accompanying drawings in which:

FIG. 1 is a diagrammatic representation of a load sensor according to an embodiment of the invention;

FIG. 2 shows diagrammatically a plan view of another embodiment according to the invention;

FIG. 3 shows diagrammatically a plan view of a third embodiment;

FIG. 4 shows diagrammatically a plan view of a fourth embodiment;

FIG. 5 shows diagrammatically a plan view of a fifth embodiment; and

FIG. 6 shows in perspective a part of the FIG. 4 embodiment.

DESCRIPTION OF THE PREFERRED EMBODIMENT

The load sensor shown in FIG. 1 incorporates a filament f which extends between fixed mounting terminations 12 and 13 on a support S. The filament f carries two transverse plates forming masses $M_1$, $M_2$ which are of equal dimensions and formed of the same material so that they both have the same moment of inertia about the axis of the filament. The plates form vibratory masses of a mechanical resonant system. The resilience of the system is provided by torsional resilience in the filament f and in particular by a central resilient portion 16 of filament f joining the two masses and two outer portions joining the masses to the terminations 12 and 13. The intended vibratory mode of the system is such that the two plates are deflected about the axis of the filament in opposite rotational directions as shown by the deflected positions of the plates and indicated by the arrows 19 and 21. The primary resilience controlling this vibratory motion is the central section of the filament f which is twisted to an angle equal to the sum of the deflections. The outer sections of the filament are each twisted through an angle equal to a single deflection. The reduced deflection of the outer sections of the filament reduces their effect on the resonant system compared with the central section and this effect may be reduced even further by making the outer sections longer or narrower than the central section. An alternative mode of resonance of the system would be for the masses to be deflected angularly in unison under the control of the torsional resilience of the outer sections of filament. The resonant frequency in this mode should be made well outside the operating range of frequencies in the intended mode of operation and this can be achieved by ensuring a low torsional stiffness for the outer sections of filament f.

It is convenient to form the support S, the masses and the three sections of filament as a single unit by a selective etching process on a silicon wafer. By this technique a small mechanical system can be manufactured accurately. With this construction, the filament is constituted by three separate sections rather than a continuous filament but this is a practical detail which is not fundamental to the invention.

The load sensor is provided with an electrical drive for coupling an input signal to the masses to cause them to vibrate about the filament axis and is discussed in greater detail in FIGS. 4 and 6. The drive in this example is constituted by four fixed electrodes $E_{1A}$, $E_{1B}$ $E_2$, $E_3$ across which a sinusoidal electrical input signal is applied. This input signal is coupled by electrostatic attraction and repulsion to mechanical oscillation of the masses. Oscillation of the masses about the filament axis varies the capacitances between the masses and the electrodes. When suitable electrical polarisation is applied between the silicon support S and reference or earth an electrical output signal at the frequency of oscillation is generated. Resonance occurs over a very narrow frequency band so that the system has a very high Q.

The resonant frequency varies with tension in the filament and this tension is changed by the load L applied to the sensor.

The load sensor can be operated to detect whether or not the load L is at a desired value by comparing the output frequency with a preset frequency, or alternatively, the output frequency range can be calibrated in terms of the load L either directly or as some other parameter dependent on load L e.g. pressure, etc. One form of electrical circuit is described in FIG. 6 and is applicable to this and all the other embodiments.

Because of the balanced nature of the vibratory mode used, spurious external vibrations tend not to be transmitted to the system and this makes spurious response of the system unlikely. Also, as previously explained, any other vibratory mode about the filament axis is kept to a frequency outside the range of operation of the system.

Referring to FIG. 2 laminar masses $M_1$ and $M_2$ are supported by filaments $f_1$, $f_2$, $f_3$, $f_4$, and by filaments $f_5$, $f_6$, $f_7$, $f_8$ respectively. The restoring force provided by the filament is a combination of torsional and tensile forces. The support structure S preferably encircles the masses $M_1$ and $M_2$ and their associated filaments and the whole is fabricated by selectively etching a single silicon wafer. The lower surface of the wafer would coincide with the plane of the filaments and the masses and the whole would be mounted via a closed loop gasket of e.g. Mylar tape about 12 microns thick, on an insulating substrate SUB of e.g. glass with metallised portions serving as electrodes $E_1$, $E_2$, $E_3$ shown in broken line in the drawing.

The masses $M_1$ and $M_2$ and their associated filaments would have a thickness of about 5 microns.

FIG. 3 shows an embodiment in which the masses $M_1$ and $M_2$, similar to FIG. 2, are supported from support $S_2$ by filaments $f_9$, $f_{10}$ and $f_{14}$ on one side and by filaments $f_{11}$, $f_{12}$ and $f_{13}$ on the other side. Filaments $f_{13}$ and $f_{14}$ provide a restoring force which is mainly tensile while the other filaments provide a combination of mainly tensile and torsional restraining forces. Otherwise the sensor is constructed in the same manner as FIGS. 1 and 2.

FIG. 4 shows an embodiment in which the masses $M_1$ and $M_2$ have a common axis of angular vibration. Filaments $f_{15}$, $f_{16}$ on the one hand and $f_{17}$ and $f_{18}$ on the other support the respective masses $M_1$ and $M_2$ from the support structure $S_3$ and there is an intermediate filament $f_{19}$ joining the two masses $M_1$, $M_2$.

A perspective view of part of FIG. 4 which has been sectional through $M_2$ at x—x is shown in FIG. 6, and shows the right hand mass $M_2$ supported by filaments $f_{18}$, $f_{19}$ from support structure $S_3$. It also shows as an example part of the glass substrate SUB supporting two of the electrodes $E_1$, $E_2$, and schematically the basic electrical connections and circuit components: these comprise a bias source 30 connected between the silicon support $S_3$ and earth and an amplifier 31 providing feedback from one electrode $E_1$ to the other $E_2$ in order to maintain angular vibration of the mass $M_2$. Likewise mass $M_1$ will be vibrating angularly in anti-phase because electrodes $E_1$ and $E_3$ would be connected together. This will be the same for all embodiments described here. The resonating masses $M_1$, $M_2$ are thus driven by electrostatic forces and the output signal OP provides an output frequency determined by the resonance of the system and which, in turn, is determined by the applied load in the direction of the arrow A parallel to the axis or axes of angular vibration of the masses. There is an a.c. change in capacitance between the tips of the masses and the adjacent electrodes as vibration takes place. In the drawing mass $M_2$ is shown in one extreme angular position i.e. close to electrode $E_2$ and far from electrode $E_1$. Arrow $A_1$ shows the movement of the tip of mass $M_2$.

The electrical arrangement described operates the sensor in a self-exciting mode by correct choice of the phase relationship between the input and output of the amplifier 31. Oscillation can be initiated by any chance effect; for example noise in the amplifier will start the oscillation.

FIG. 5 shows another embodiment in which masses $M_1$ and $M_2$ are supported by the filaments $f_{20}$, $f_{21}$ and the restoring force is mainly tensile in the filament. Otherwise the manner of construction and operation is the same as previously described except that the force being sensed or measured would be in a direction parallel to the filament and thus normal to the axes of angular vibration of masses $M_1$, $M_2$.

In all the embodiments described air damping can be significant and in some applications the resonant system will be sealed in a vacuum enclosure.

In all the embodiments described the thickness of the masses $M_1$, $M_2$ and the filament is the same and of the order of ten microns. It could be anywhere in the range three to thirty microns. Each of the filaments is in fact a ribbon i.e. wider than it is thick, and the width is about thirty microns; it could however be anything in the range ten to a hundred microns.

The resonant frequency of the embodiments described is around ten KHz, but in other embodiments could lie anywhere in the range one to twenty KHz.

What is claimed is:

1. A load sensor comprising: first and second supports; first and second plates thin in comparison to their lengths and widths; first and second filament portions supporting said first and second plates, respectively, from said first and second supports, respectively, on a common axis, said first and second plates being essentially in planes through said common axis and being symmetrical about said common axis; and a third filament portion connecting said first and second plates on said common axis, all of said filament portions being on said common axis, such of said filament portions having a cross section small in comparison to the lengths and widths of said plates, said plates being oscillatory simultaneously in opposite directions about said common axis at a resonant frequency which is proportional to the tensile strain on said filament portions.

2. A load sensor comprising a balanced vibratory system including two lamina masses supported by filaments in tension from a support structure and electrically coupled to electrodes for causing angular vibration of the masses, and for providing an output signal, said filaments including first and second filament sections disposed between said first and second masses, respectively, and said support structure and a third filament section disposed between said first and second masses, wherein the resonant frequency of the system can be sensed from the output signal and serves as a measure of the load applied to the sensor, the masses and the filaments having been fabricated by a photolithographic process, wherein said masses oscillate oppositely in a resonant mode in which said two masses move in an anti-phase relationship, and wherein the rotational stiffness of each of said first and second filament sections is less than the stiffness of said third filament section so that the frequency at which the two masses vibrate in phase is remote from the frequency at which they vibrate in anti-phase.

3. A load sensor comprising a balanced vibratory system including two lamina masses supported by filaments in tension from a support structure and electrically coupled to electrodes for causing angular vibration of the masses, and for providing an output signal, wherein the resonant frequency of the system can be sensed from the output signal and serves as a measure of the load applied to the sensor, the masses and the filaments having been fabricated by a photolithographic process, wherein the assembly of filaments and plates is formed by a selective etching process from a silicon wafer, and mounting terminations for the filament formed integrally from unetched portions of said silicon wafer.

* * * * *